June 28, 1938.  F. L. DUFFIELD  2,122,197
PRODUCTION OF IRON FROM IRON ORE
Filed May 4, 1937  3 Sheets-Sheet 1

Inventor:
Frederick Lindley Duffield,
By his Attorneys,
Fraser, Myers & Manley

June 28, 1938.  F. L. DUFFIELD  2,122,197
PRODUCTION OF IRON FROM IRON ORE
Filed May 4, 1937  3 Sheets-Sheet 2

Inventor:
Frederick Lindley Duffield,
By his Attorneys,
Fraser, Myers & Manley

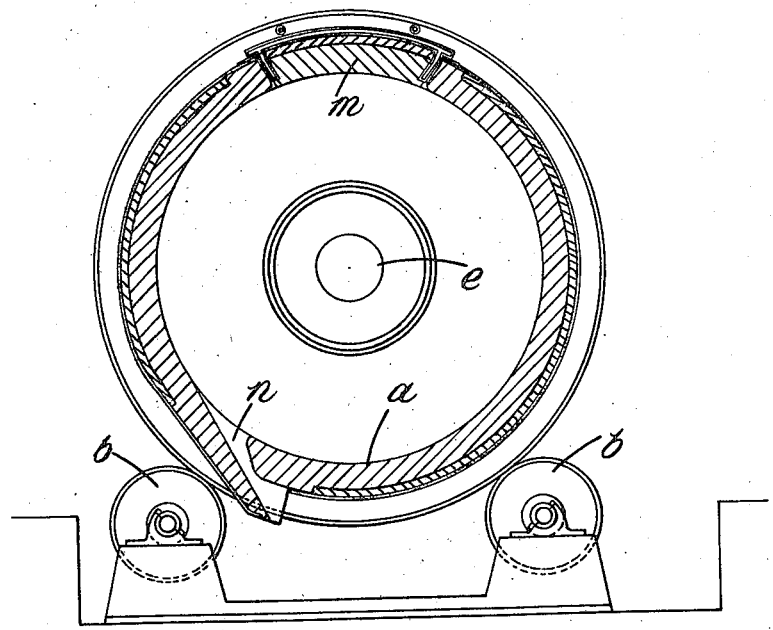

Patented June 28, 1938

2,122,197

UNITED STATES PATENT OFFICE 2,122,197

PRODUCTION OF IRON FROM IRON ORE

Frederick Lindley Duffield, London, England

Application May 4, 1937, Serial No. 140,618
In Great Britain May 6, 1936

2 Claims. (Cl. 75—29)

This invention relates to the production of iron from iron ore.

Existing methods for producing molten iron of high purity are founded on the principle of purifying the crude product of the blast furnace by treatment in the Bessemer or open hearth furnaces. The object of the present invention is to obtain pure iron (99.84%) directly from the ore, thereby avoiding the inclusion of impurities which entail subsequent elimination by refining methods.

In the past the production of so-called sponge iron, i. e. iron produced at temperatures below fusion point, has been attempted to secure a base of high purity which is intended for melting in some suitable kind of furnace.

Great difficulty has been experienced in producing sponge iron in a practical manner, and the applicant has found that even if economical production of sponge iron were accomplished, the product, due to its powdery state and low conductivity due to excessive porosity, is an extremely inconvenient and difficult material to melt efficiently in any kind of furnace.

One of the advantages claimed in the production of sponge iron as an intermediate product for molten iron and steel production is its adaptability for concentration of its iron contents by magnetic separation. The applicant has found from long experience that the iron contents of the majority of ores is so intimately physically combined with its gangue matter that the latter becomes entrained in that which is magnetic, and no sufficient elimination of the original gangue matter of the ore is achieved to render the process serviceable or practicable.

There have been attempts in the past to reduce and melt or semi-melt iron ore in rotary furnaces, but by long experience it has been found that certain salient principles are necessary for its practical and economical accomplishment.

When granulated or powdered iron ore is mixed with its required quantity of granulated or powdered coal for reduction, whether firstly reduced by heat or fed directly into a rotary furnace, upon semi-fusion it adheres to the side walls of the revolving furnace, incurring maximum exposure to the effect of the oxidizing furnace gases, which burn the coal which has been added for the purpose of filling its function of reduction, and a poor result is inevitable.

Even if fed upon a bath of molten slag at such a rate that its rapid heat absorption is insufficient to cause the slag to become viscous, with attendant wall adhesion, it floats on the surface of such slag, and in that position exposes its carbon contents to oxidation by the furnace gases, such carbon thus failing in its intended duty of reduction of the iron oxides.

It has been found by experimentation that these defects which operate against the practical accomplishment of producing an iron conglomerate or matter direct from the ore can be overcome by the present invention.

According to the present invention the iron ore is mixed in a granulated state with carbonaceous material, moulded into blocks, slabs, briquettes or other shaped bodies and charged into a furnace heated interiorly by combustion so that they fall into and are submerged in a bath of molten slag contained in said furnace, whereby the slag constitutes a protective coating for the shaped bodies, protecting them against the oxidizing atmosphere of the oxidizing gases in the furnace, and the reduction proceeds within the slag coating by reason of heat absorbed from the slag, whereupon the ore is reduced and the iron particles drop to the bottom and coalesce and can be removed from the furnace in the form of relatively large masses of semi-molten iron with some included slag.

The slag can be removed from the iron mass discharged from the reduction chamber by subsequent treatment in an electric or other furnace; alternatively the slag may be removed by a mechanical squeezing process.

The process may be carried out in apparatus comprising an oscillating furnace provided with a door for the discharge of the reduced metal, a taphole for discharging slag, means for charging the furnace, means for admitting heating gases into the furnace and an additional air inlet adjacent to the exit flue for the heating gases, this last air inlet being arranged so that the air admitted thereby has a direction which is opposed to that of the outlet gases.

The furnace should be of squat shape, that is to say the length should not exceed three times the diameter, so that in this way a substantially uniform temperature sufficiently high to maintain the slag in a fluid state can be maintained throughout the furnace.

The invention will be described with reference to the accompanying drawings which illustrate one form of apparatus which may be used for carrying out the invention.

Fig. 3 is a central cross section.

The oscillating furnace $a$ has a length about twice its diameter and is mounted for rotation on rollers $b, b$. Fuel consisting of coal dust and air is admitted tangentially through aperture $c$ and additional air is admitted tangentially through aperture $d$ arranged in a cylindrical end chamber $e$. The other end of the furnace is provided with a main charging passage $f$ and an auxiliary charging passage $g$ arranged in the wall of the charging passage $f$. The passage $f$ also constitutes an exit flue for the gases of combustion, and is completed by a movable flue $k$ mounted on rollers so that it can be moved away from the passage $f$ when it is desired to charge through this passage. An auxiliary air jet $l$ is provided in the wall of the passage $f$ and is directed towards the interior of the furnace, i. e. in a direction which is opposed to that of the exit gases. A discharge door $m$ is provided in the wall of the furnace remote from a tangentially disposed taphole $n$ for slag.

In order to carry out the process according to the present invention the iron ore to be reduced is granulated and mixed with a corresponding quantity of granulated carbon sufficient to effect the reduction of the iron oxides and attendant moisture, and is pressed or moulded into blocks or briquettes with a suitable binding agent. The binding agent may be omitted if desired, as it is not absolutely essential in the moulding operation.

Figure 1:
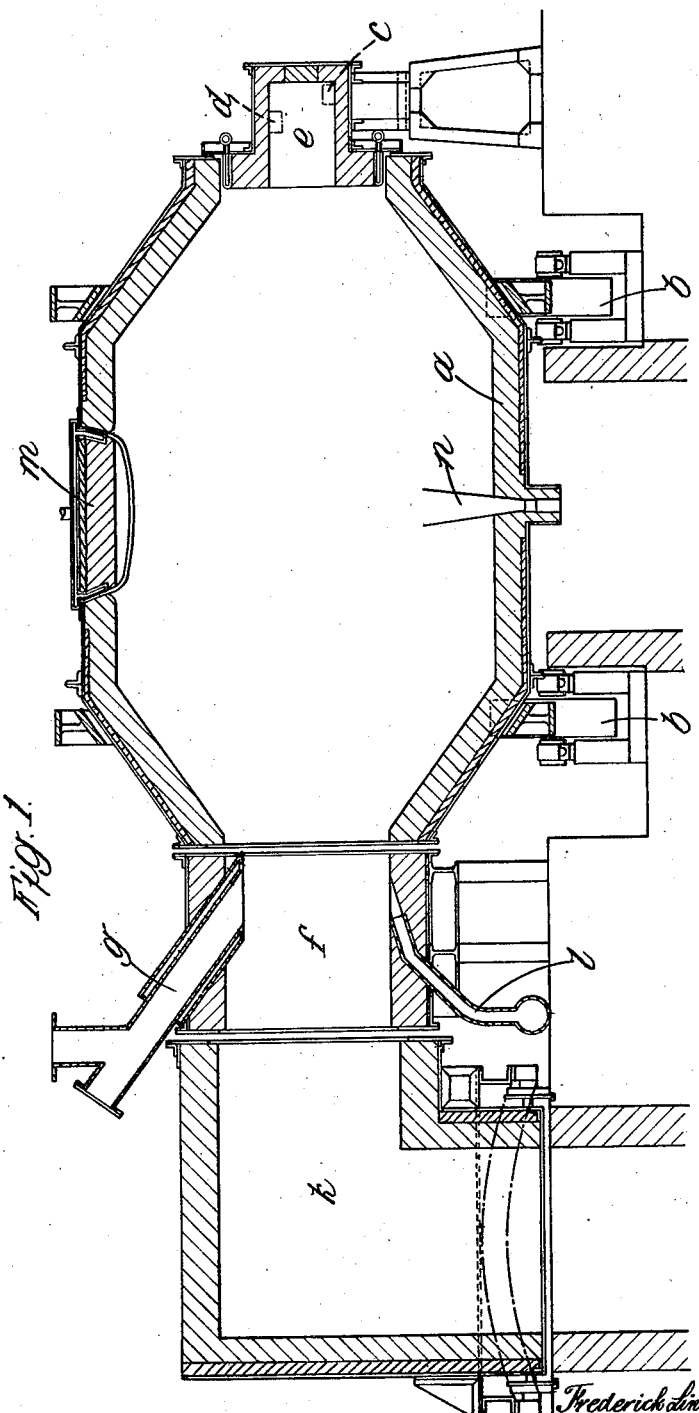
Fig. 1 illustrates a vertical section of the apparatus.
Figure 2:
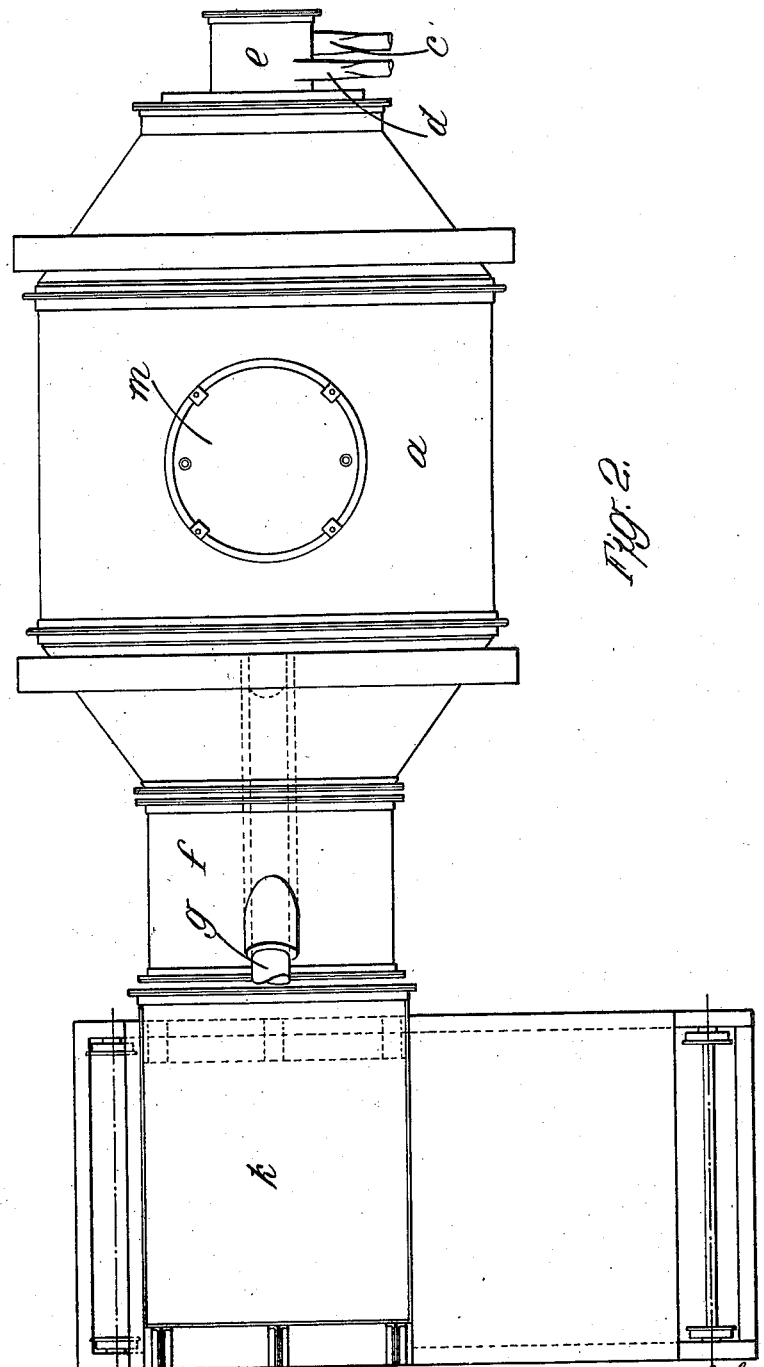
Fig. 2 is a plan view.

Slag is introduced first into the furnace and is heated by admitting burning gases from the inlet apertures $c$ and $d$ until the slag is molten. This molten slag forms a liquid bed on the bottom of the furnace into which the moulded blocks are introduced by charging either through the charging passage $f$, if the movable flue $k$ is removed, or through the charging passage $g$, if the movable flue $k$ is in the position shown in Fig. 1. The momentum of the blocks or briquettes as they are charged into the furnace causes them momentarily to be fully submerged in the molten slag, which adheres to the colder surface of the block or briquette and provides an enveloping protection against oxidation.

The low conductivity of the block or briquette, by reason of its thickness compared with small granular pieces of ore and coal, prevents a too sudden and rapid absorption of heat which would render the receiving bath of slag sufficiently viscous to adhere to the walls of the furnace.

It is essential that the slag should remain fluid, and this is assisted by the slower uptake of heat which, in gradually penetrating the blocks or briquettes, effects reduction of the oxide contents at low temperature which is controlled by the limits of its low conductivity. Complete reduction is effected by this gradual heat penetration without disturbing the equilibrium of heat supply and demand of combustibles and fluid slag respectively.

By making the furnace of relatively squat shape, that is to say not too long relatively to its diameter, the slag melting temperature is retained throughout the whole length. If the length of the furnace were too long relatively to its width it will be evident that the temperature at the outlet end of the furnace would fall below that required for making and maintaining the slag fluid, so that the latter will adhere to the wall of the furnace and thus cause obstruction.

Another reason for keeping the slag fluid at all times throughout the period of operation is to enable the reduction of the iron oxides by carbon to proceed and be completed at the low temperatures regulated by the conductivity of the thickness of the mass constituting the block or briquette.

At temperatures ranging between 1150° C. and 1400° C. fusion of the oxides of iron in combination with silica is effected, producing ferrous silicates, so that little or no practical reduction by carbon takes place, since silica at such temperatures has a greater affinity for iron oxides than carbon. Consequently unless the oxides of iron are reduced at temperatures below their fusion point, as provided by slow heat penetration of the block or briquette, a preponderance of reaction is in the formation of ferrous silicates. Thus if granulated ore and carbon were fed in a loose (non-briquetted) state on to a fluid slag, the respective particles of iron oxide and carbon would fail in their desired reaction, the iron oxide combining with the silica present in the slag and the carbon being lost by the oxidation of the furnace gases.

At temperatures higher than 1400° C. the ferrous silicates dissociate if sufficient carbon and lime be present, and metallic iron is precipitated, but the formation of ferrous silicates is undesirable, firstly because of their erosive effect on any furnace lining, and further the metallic iron thus precipitated has not that purity that is obtained by its direct reduction at temperatures below its fusion point. To retain the slag in a state of fluidity advantage is taken of the low rate of heat transfer to the block or briquette, and the rate of feeding the charge is regulated to coincide with the heat supply.

As the reduction proceeds the blocks disintegrate and the iron particles drop to the bottom of the furnace and coalesce into one or more masses. When the reduction is finished the slag is first drawn off through the taphole $n$ and the masses of coalesced iron particles are subsequently discharged by gravity by rotating the furnace so that gravitation is lowermost. A sufficient quantity of slag is then reintroduced into the furnace and the process is continued with a new charge.

The combustible gases which emanate from the blocks in process of reduction are burned before leaving the furnace by means of the auxiliary air admitted through the air jet $l$, which helps to maintain the required temperature at the outlet end of the furnace.

All the air admitted through the various air inlets may be pre-heated, for example by contact in a recuperator or regenerator with the heat of the combustion products after leaving the oscillating furnace, either prior to or after such combustion products have been partially used for calcining or drying the ore before being formed into briquettes.

The oscillating furnace shown in the drawings rotates approximately 270° in one direction and then through a corresponding angle in the reverse direction. Other forms of furnace may be used for carrying out the process according to the invention.

It has been found by experience that whereas sponge iron presents the utmost difficulty in melting in the electric furnace by reason of its poor heat conductive power caused by its excessive porosity, the conglomerate mass obtained according to the present invention readily yields to the heat of the electric furnace, and a rapid melt ensues with efficient separation of the molten metal and the minimum of metallic inclusions in the slag.

What I claim and desire to secure by Letters Patent is:—

1. Process for producing iron from iron ore which consists in mixing the iron ore in a granulated state with carbonaceous material, moulding the mixture into blocks, slabs, briquettes or other shaped bodies and charging the said shaped bodies into a furnace heated interiorly by combustion so that they fall into and are submerged in a bath of molten slag contained in said furnace, whereby the slag constitutes a protective coating for the shaped bodies, protecting them against the oxidizing atmosphere of the oxidizing gases in the furnace, and the reduction proceeds within the slag coating by reason of heat absorbed from the slag, whereupon the ore is reduced and the iron particles drop to the bottom and coalesce and can be removed from the furnace in the form of relatively large masses of semi-molten iron with some included slag.

2. Process according to claim 1 further consisting in admitting a separate supply of air into the furnace in a direction opposed to that of the outlet gases for burning the gaseous reaction products resulting from the reaction between the iron ore and carbon of the blocks or the like.

FREDERICK LINDLEY DUFFIELD.